(12) United States Patent
Ohori (10) Patent No.: US 12,208,774 B2
(45) Date of Patent: Jan. 28, 2025

(54) MOTOR DEVICE, WIPER DEVICE, AND MOTOR CONTROL METHOD

(71) Applicant: MITSUBA Corporation, Gunma (JP)

(72) Inventor: Ryo Ohori, Gunma (JP)

(73) Assignee: MITSUBA Corporation, Gunma (JP)

(*) Notice: Subject to any disclaimer, the term of this patent is extended or adjusted under 35 U.S.C. 154(b) by 0 days.

(21) Appl. No.: 18/034,363

(22) PCT Filed: Jul. 21, 2022

(86) PCT No.: PCT/JP2022/028316
§ 371 (c)(1),
(2) Date: Apr. 27, 2023

(87) PCT Pub. No.: WO2023/067862
PCT Pub. Date: Apr. 27, 2023

(65) Prior Publication Data
US 2023/0373442 A1 Nov. 23, 2023

(30) Foreign Application Priority Data

Oct. 22, 2021 (JP) .................................. 2021-172968

(51) Int. Cl.
*B60S 1/08* (2006.01)
*H02K 11/33* (2016.01)
(52) U.S. Cl.
CPC ............ *B60S 1/0807* (2013.01); *H02K 11/33* (2016.01)
(58) Field of Classification Search
CPC ............................... B60S 1/0807; H02K 11/33
See application file for complete search history.

(56) References Cited

U.S. PATENT DOCUMENTS

| 2015/0082575 | A1* | 3/2015 | Kimura | ................... H02P 6/153 |
| | | | | 318/400.14 |
| 2020/0291705 | A1* | 9/2020 | Takenaka | .................. H02P 7/00 |
| 2020/0353896 | A1* | 11/2020 | Sugimoto | ............. B60S 1/0452 |

FOREIGN PATENT DOCUMENTS

| JP | 2018038203 | 3/2018 |
| JP | 2019047580 | 3/2019 |

OTHER PUBLICATIONS

"International Search Report (Form PCT/ISA/210) of PCT/JP2022/028316", mailed on Sep. 6, 2022, pp. 1-3.

* cited by examiner

*Primary Examiner* — Zoheb S Imtiaz
(74) *Attorney, Agent, or Firm* — JCIPRNET (57) ABSTRACT

A motor device includes a motor having three-phase windings; a rotation speed detector detecting a rotation speed of the motor; a drive signal generator controlling a duty ratio not to exceed a duty ratio upper limit value, and performing control for an energization angle of each phase and performing advance angle control shifting the phase from a reference position to generate a drive signal corresponding to the duty ratio; and an inverter supplying alternating current to the windings based on the drive signal. The drive signal generator includes an advance angle/energization angle controller changing the energization angle to 120 degrees or less while performing advance angle control when the duty ratio is equal to or greater than the duty ratio upper limit value and the rotation speed is equal to or less than a predetermined threshold value in a state where the energization angle is greater than 120 degrees.

13 Claims, 6 Drawing Sheets

MOTOR DEVICE, WIPER DEVICE, AND MOTOR CONTROL METHOD

CROSS-REFERENCE TO RELATED APPLICATION

This application is a 371 application of the International PCT application serial no. PCT/JP2022/028316, filed on Jul. 21, 2022, which claims the priority benefits of Japan Patent Application No. 2021-172968, filed on Oct. 22, 2021. The entirety of each of the above-mentioned patent applications is hereby incorporated by reference herein and made a part of this specification.

TECHNICAL FIELD

The invention relates to a motor device, a wiper device, and a motor control method.

RELATED ART

In terms of motor devices used in wiper devices for vehicles or the like, in recent years, there are motor devices that have a function of limiting the output of the motor by an upper limit value of the output duty in order to prevent an overcurrent. Further, for such motor devices, there is known a technique of using wide-angle energization which sets the energization angle greater than 120 degrees in order to improve the output of the motor (see, for example, Patent Literature 1).

CITATION LIST

Patent Literature

[Patent Literature 1] Japanese Patent Laid-Open No. 2018-038203

SUMMARY OF INVENTION

Technical Problem

However, in the conventional motor device as described above, when wide-angle energization is performed, an overcurrent may occur even though the output is suppressed by the upper limit value of the output duty.

In view of the above, the invention provides a motor device, a wiper device, and a motor control method capable of reducing the occurrence of an overcurrent.

Solution to Problem

In view of the above, one aspect of the invention provides a motor device, including: a motor that has windings of three phases and is rotationally driven; a rotation speed detector that detects a rotation speed of the motor; a drive signal generator that controls a duty ratio indicating a drive output of the motor so as not to exceed a duty ratio upper limit value, and performs control for an energization angle of each phase of the three phases and performs advance angle control for shifting the phase from a reference position to generate a drive signal corresponding to the duty ratio; and an inverter that supplies an alternating current to the windings of three phases based on the drive signal. The drive signal generator includes an advance angle/energization angle controller that changes the energization angle to 120 degrees or less while performing the advance angle control in response to the duty ratio being equal to or greater than the duty ratio upper limit value and the rotation speed of the motor being equal to or less than a predetermined threshold value in a state where the energization angle is greater than 120 degrees.

Another aspect of the invention provides a motor control method for a motor device including a motor that has windings of three phases and is rotationally driven, and an inverter that supplies an alternating current to the windings of three phases based on a drive signal. The motor control method includes: rotation speed detecting in which a rotation speed detector detects a rotation speed of the motor; and drive signal generating in which a drive signal generator controls a duty ratio indicating a drive output of the motor so as not to exceed a duty ratio upper limit value, and performs control for an energization angle of each phase of the three phases and performs advance angle control for shifting the phase from a reference position to generate the drive signal corresponding to the duty ratio. In the drive signal generating, the motor control method further includes: advance angle/energization angle controlling in which an advance angle/energization angle controller of the drive signal generator changes the energization angle to 120 degrees or less while performing the advance angle control in response to the duty ratio being equal to or greater than the duty ratio upper limit value and the rotation speed of the motor being equal to or less than a predetermined threshold value in a state where the energization angle is greater than 120 degrees.

Effects of Invention

According to the invention, it is possible to reduce the occurrence of an overcurrent.

BRIEF DESCRIPTION OF DRAWINGS

(a) and (b) of FIG. 5 are diagrams illustrating the current flowing through the motor when the energization angle of the motor device according to the first embodiment exceeds 120 degrees.

(a) and (b) of FIG. 6 are diagrams illustrating the current flowing through the motor when the energization angle of the motor device according to the first embodiment is 120 degrees.

DESCRIPTION OF EMBODIMENTS

Hereinafter, a motor device, a wiper device, and a motor control method according to an embodiment of the invention will be described with reference to the drawings.

First Embodiment

Figure 1:
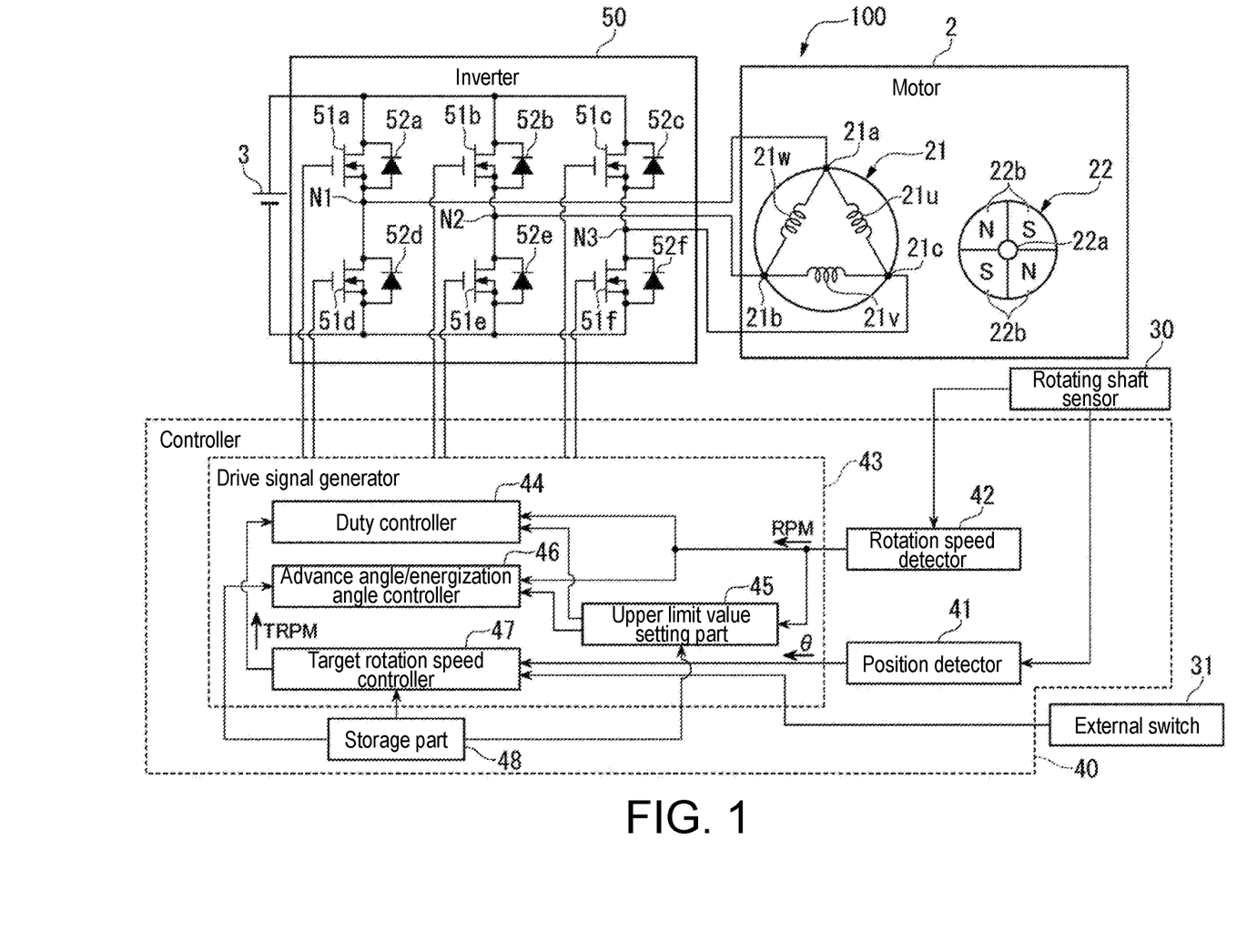
FIG. 1 is a block diagram showing an example of the motor device according to the first embodiment.

FIG. 1 is a block diagram showing an example of a motor device 100 according to the first embodiment.

As shown in FIG. 1, the motor device 100 includes a motor 2, a rotating shaft sensor 30, a controller 40, and an inverter 50.

The motor device 100 according to this embodiment is used, for example, in a wiper device for wiping the window glass of a vehicle.

The motor 2 is, for example, a three-phase four-pole brushless motor. The motor 2 is rotationally driven by an output signal (applied voltage) output by the inverter 50 based on a drive signal which will be described later.

In addition, the motor 2 includes a stator 21 and a rotor 22.

The stator 21 is fixed to the inner circumference of the case of the motor 2. The stator 21 includes three-phase armature coils (21u, 21v, 21w). The stator 21 is wound with the armature coils (21u, 21v, 21w). For example, the three-phase armature coils (21u, 21v, 21w) are connected by delta connection.

In the delta connection, the armature coil 21u and the armature coil 21w are connected by a connection point 21a, the armature coil 21v and the armature coil 21w are connected by a connection point 21b, and the armature coil 21u and the armature coil 21v are connected by a connection point 21c.

The rotor 22 is provided inside the stator 21. The rotor 22 includes, for example, a rotor shaft 22a and four-pole permanent magnets 22b attached to the rotor shaft 22a. A plurality of bearings (not shown) are provided in the case of the motor 2, and the rotor shaft 22a is rotatably supported by the plurality of bearings.

The rotating shaft sensor 30 detects a signal corresponding to the rotation of the rotor 22. The rotating shaft sensor 30 includes, for example, three Hall ICs (not shown). These three Hall ICs output pulse signals with phases shifted by 120 degrees from each other to the controller 40 when the rotor 22 rotates. That is, as the rotor 22 rotates, the rotating shaft sensor 30 generates pulse signals based on a change in the magnetic pole of a sensor magnet (not shown) arranged on the rotor shaft 22a and outputs the pulse signals to the controller 40. Each Hall IC detects a position shifted by an electrical angle of 120°. Further, each Hall IC is installed with respect to the rotor 22 so that when the output of the inverter 50 is changed immediately at each position where the level of the output signal of each Hall IC changes, that is, each position where an edge occurs in the output signal, the advance angle is 30 degrees in electrical angle.

The inverter 50 is PWM (Pulse Width Modulation) controlled based on a drive signal generated by a drive signal generator 43 which will be described later, and applies a voltage to the three-phase armature coils (21u, 21v, 21w) of the motor 2. That is, the inverter 50 causes the switching elements (51a to 51f) to perform a switching operation (conducting/non-conducting) based on the drive signal generated by the drive signal generator 43, and changes the magnitude (duty ratio) of the output of the voltage applied to the motor 2, the energization period (energization angle), and the energization timing (advance angle). Here, the duty ratio represents the ratio of the conduction period of the corresponding switching element in the PWM cycle.

The inverter 50 generates the applied voltage from the DC power supplied from a battery 3. The battery 3 is, for example, a DC power supply such as a lead storage battery or a lithium-ion battery, and supplies electric power for driving the motor 2.

The inverter 50 includes six switching elements 51a to 51f and diodes 52a to 52f, which are three-phase bridge-connected.

The switching elements 51a to 51f are, for example, N-channel MOSFETs (Metal Oxide Semiconductor Field Effect Transistors), and constitute a three-phase bridge circuit.

The switching element 51a and the switching element 51d are connected in series between the positive terminal and the negative terminal of the battery 3 to constitute a U-phase bridge circuit. The switching element 51a has a drain terminal connected to the positive terminal of the battery 3, a source terminal connected to the node N1, and a gate terminal connected to the signal line of the U-phase upper drive signal. Further, the switching element 51d has a drain terminal connected to the node N1, a source terminal connected to the negative terminal of the battery 3, and a gate terminal connected to the signal line of the U-phase lower drive signal. In addition, the node N1 is connected to the connection point 21a of the motor 2.

The switching element 51b and the switching element 51e are connected in series between the positive terminal and the negative terminal of the battery 3 to constitute a V-phase bridge circuit. The switching element 51b has a drain terminal connected to the positive terminal of the battery 3, a source terminal connected to the node N2, and a gate terminal connected to the signal line of the V-phase upper drive signal. Further, the switching element 51e has a drain terminal connected to the node N2, a source terminal connected to the negative terminal of the battery 3, and a gate terminal connected to the signal line of the V-phase lower drive signal. In addition, the node N2 is connected to the connection point 21b of the motor 2.

The switching element 51c and the switching element 51f are connected in series between the positive terminal and the negative terminal of the battery 3 to constitute a W-phase bridge circuit. The switching element 51c has a drain terminal connected to the positive terminal of the battery 3, a source terminal connected to the node N3, and a gate terminal connected to the signal line of the W-phase upper drive signal. Further, the switching element 51f has a drain terminal connected to the node N3, a source terminal connected to the negative terminal of the battery 3, and a gate terminal connected to the signal line of the W-phase lower drive signal. In addition, the node N3 is connected to the connection point 21c of the motor 2.

Furthermore, the diode 52a has an anode terminal connected to the node N1 and a cathode terminal connected to the positive terminal of the battery 3. The diode 52d has an anode terminal connected to the negative terminal of the battery 3 and a cathode terminal connected to the node N1.

Besides, the diode 52b has an anode terminal connected to the node N2 and a cathode terminal connected to the positive terminal of the battery 3. The diode 52e has an anode terminal connected to the negative terminal of the battery 3 and a cathode terminal connected to the node N2.

In addition, the diode 52c has an anode terminal connected to the node N3 and a cathode terminal connected to the positive terminal of the battery 3. The diode 52f has an anode terminal connected to the negative terminal of the battery 3 and a cathode terminal connected to the node N3.

The controller 40 is a processor including, for example, a CPU (Central Processing Unit) or the like, and controls the motor device 100 in an integrated manner. The controller 40 generates a drive signal corresponding to the target rotation output of the rotor 22 (for example, target rotation speed TRPM), and outputs the generated drive signal to the inverter 50. Further, the controller 40 controls the driving of the motor 2 via the inverter 50 by, for example, rectangular wave energization.

Also, the controller 40 includes a position detector 41, a rotation speed detector 42, a drive signal generator 43, and a storage part 48.

The position detector 41 detects the rotational position (θ) of the rotor 22 based on the pulse signal supplied from the rotating shaft sensor 30. The position detector 41 outputs the detected rotational position of the rotor 22 to the drive signal generator 43 which will be described later.

The rotation speed detector 42 detects, for example, the rotation speed (RPM) of the motor 2 (rotor 22) based on the pulse signal supplied from the rotating shaft sensor 30, and outputs the detected rotation speed (motor rotation speed) of the motor 2 (rotor 22) to the drive signal generator 43 which will be described later.

In this specification, the "rotation speed" means the "speed of rotation" indicating the number of rotations per unit time.

The drive signal generator 43 controls an output command value, which is a duty ratio (output duty) indicating the drive output of the motor 2, so as not to exceed a duty limit value (duty ratio upper limit value), and performs control of the energization angle of each phase of the three phases and performs advance angle control for shifting the phase from a reference position to generate a drive signal corresponding to the output command value (output duty).

In addition, the drive signal generator 43 includes a duty controller 44, an upper limit value setting part 45, an advance angle/energization angle controller 46, and a target rotation speed controller 47.

The target rotation speed controller 47 refers to a target rotation speed map stored in the storage part 48, which will be described later, and determines the current target rotation speed (TRPM) of the motor 2 based on the output signals of the position detector 41 and the rotation speed detector 42. Further, the target rotation speed controller 47 outputs an output signal indicating the determined target rotation speed to the duty controller 44. Besides, the target rotation speed controller 47 may be configured to change the target rotation speed map to be referred to, based on a signal (for example, a signal requesting high-speed wiping or a signal requesting low-speed wiping) from an external switch 31 (for example, a wiper switch) provided separately from the motor device 100.

The duty controller 44 generates an output command value with a duty ratio corresponding to the target rotation speed determined by the target rotation speed controller 47. The duty controller 44 compares, for example, the current motor rotation speed acquired from the rotation speed detector 42 with the target rotation speed, and calculates the duty ratio to be output so as to bring the motor rotation speed close to the target rotation speed. Then, the duty controller 44 generates the output command value so that the duty ratio becomes equal to or less than a duty limit value, which will be described later, and outputs the output command value to the inverter 50.

The upper limit value setting part 45 sets the duty limit value, which is the upper limit value of the duty ratio, according to the motor rotation speed, and outputs the duty limit value to the duty controller 44. The upper limit value setting part 45 sets the duty limit value in multiple stages so that the duty limit value increases as the motor rotation speed increases, for example.

The advance angle/energization angle controller 46 generates output command values for the advance angle and energization angle of the applied voltage that the inverter 50 outputs to the motor 2. The advance angle/energization angle controller 46 performs advance angle control and energization angle control according to the result of comparison between the motor rotation speed output from the rotation speed detector 42 and a plurality of predetermined rotation speed threshold values (first threshold value, second threshold value) and the result of comparison between the output command value of the duty ratio output from the duty controller 44 and the duty limit value output from the upper limit value setting part 45, and outputs output command values to the inverter 50.

Here, the advance angle control is control that takes the position where the edge of the output signal of the rotating shaft sensor 30 occurs as the reference position and intentionally shifts the energization timing of the applied voltage that the inverter 50 outputs to the motor 2 from the reference position. For example, since the advance angle is mechanically set to 30 degrees in advance in this embodiment, the advance angle of 30 degrees is a state where the advance angle control is not performed, and for example, the advance angle of 40 degrees and the advance angle of 20 degrees are states where the advance angle control is performed. The advance angle control also includes control for retarding with respect to the reference position, such as the advance angle of 20 degrees.

Here, the energization angle control is control of the period during which the same energization state is continued in the energization of the applied voltage that the inverter 50 outputs to the motor 2. For example, the advance angle/energization angle controller 46 performs control to change the energization angle to an energization angle of 120 degrees or less, an energization angle of 121 degrees or more (wide-angle energization), etc.

The advance angle/energization angle controller 46 performs control by switching between low-speed energization control, high-speed energization control, boost control, and wide-angle prohibition control.

Here, the low-speed energization control is the energization control when the motor 2 is rotating at a low rotation speed equal to or less than a predetermined threshold value (second threshold value), and the advance angle/energization angle controller 46 fixes the energization angle to a predetermined value of 120 degrees or less and does not perform advance angle control (for example, being fixed to the mechanical advance angle of 30 degrees).

In addition, the high-speed energization control is the energization control when the output command value (output duty) has not reached the duty limit value and when the motor 2 is rotating at a high rotation speed greater than the predetermined threshold value (second threshold value), and the advance angle/energization angle controller 46 fixes the energization angle to a predetermined value exceeding 120 degrees, fixes the advance angle to a predetermined value, and performs advance angle control.

Further, the boost control is the energization control when the output command value (output duty) reaches the duty limit value and when the motor 2 is rotating at a high rotation speed greater than a predetermined threshold value (first threshold value), and the advance angle/energization angle controller 46 performs advance angle control for changing the energization angle by a value exceeding 120 degrees and changing the advance angle. In the boost control, the advance angle/energization angle controller 46 performs control to change the advance angle and the energization angle according to the target rotation speed (TRPM). Specifically, the advance angle/energization angle controller 46 increases the advance angle and the energization angle as the target rotation speed (specifically, for example, the error between the target rotation speed and the motor rotation speed) increases, and raises the rotation speed of the motor. In addition, the advance angle/energization angle controller 46 may perform the boost control when the output command value (output duty) has reached the duty limit value, when the motor 2 is rotating at a high rotation speed greater than the predetermined threshold value (first threshold value), and when the motor rotation speed is less than the target rotation speed.

Furthermore, the wide-angle prohibition control is the energization control that suppresses an overcurrent, and is the energization control when the output command value (output duty) reaches the duty limit value and when the motor 2 is rotating at a rotation speed between the boost control and the low-speed energization control (a rotation speed greater than the second threshold value and equal to or less than the first threshold value). The advance angle/energization angle controller 46 changes the energization angle to a fixed value of 120 degrees or less and performs advance angle control in the wide-angle prohibition control. Here, if the advance angle is increased when the motor rotation speed is low, there is a risk that the motor position detection accuracy may decrease. Thus, in the wide-angle prohibition control, the advance angle/energization angle controller 46 of this embodiment may also perform advance angle control to set the advance angle to a fixed value in the direction of decreasing the advance angle more than in the high-speed energization control or boost control, for example, changing the advance angle by shifting to the advance angle of 0 degree with respect to the mechanical advance angle of 30 degrees. Thus, even if the motor rotation speed decreases due to the wide-angle prohibition control, it is possible to suppress deterioration in the detection accuracy of the position detector 41.

The above-described first threshold value is a value greater than the second threshold value, and is set to a predetermined value so that an overcurrent does not occur (the motor drive current does not reach an overcurrent limit value) when the energization angle is set to 120 degrees or less in a state where the output duty is equal to or greater than the duty limit value.

The storage part 48 is composed of, for example, a ROM or the like, and stores in advance a target rotation speed map representing the relationship between the target rotation speed and the rotational position of the motor 2, a duty limit value, a rotation speed threshold value, etc.

Next, the operation of the motor device 100 according to this embodiment will be described with reference to the drawings.

Figure 2:
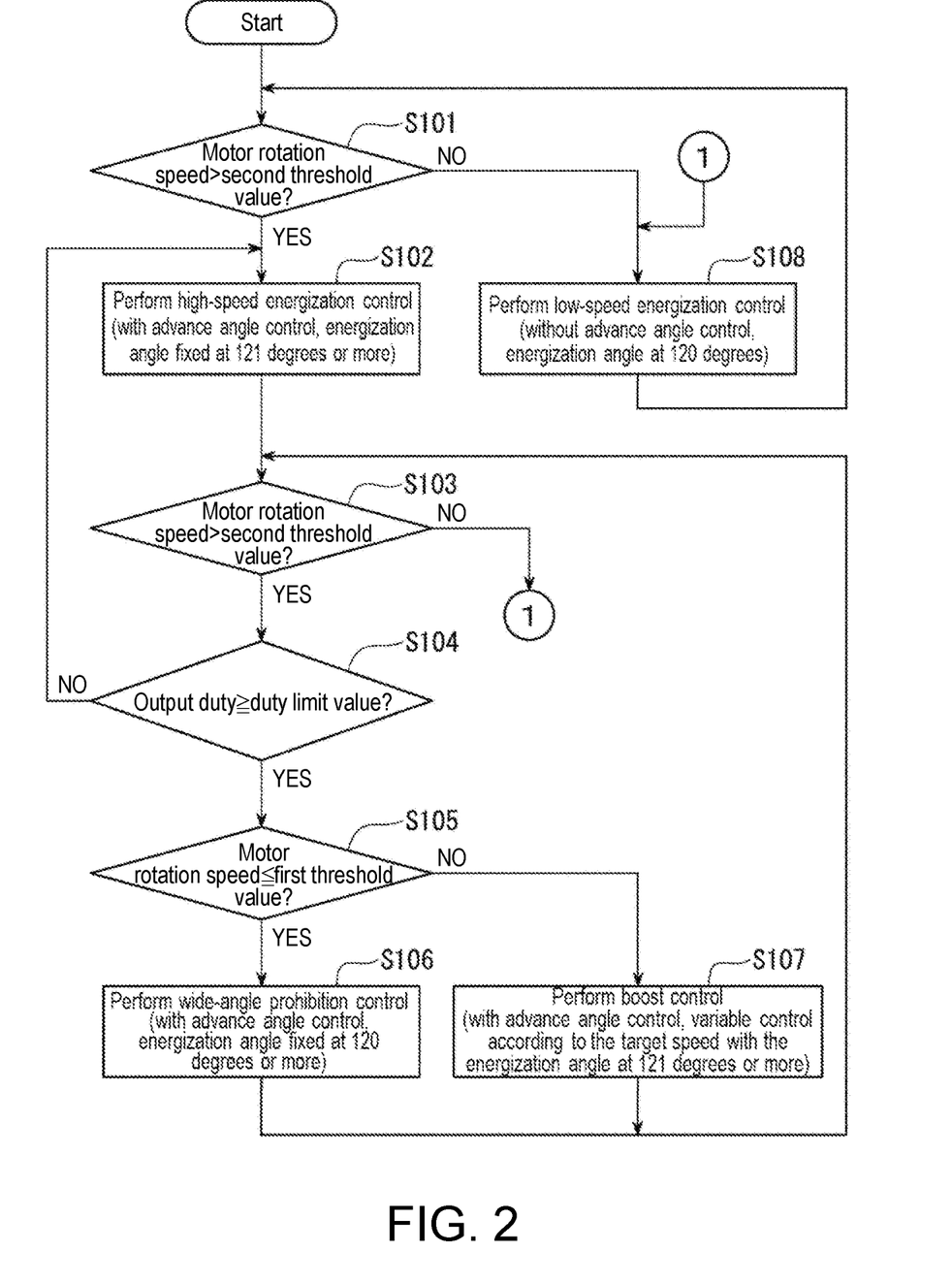
FIG. 2 is a flowchart showing an example of the energization control process of the motor device according to the first embodiment.

FIG. 2 is a flowchart showing an example of an energization control process of the motor device 100 according to this embodiment. Here, a changing process (switching process) for energization control performed by the motor device 100 will be described.

As shown in FIG. 2, the advance angle/energization angle controller 46 of the motor device 100 first determines whether the motor rotation speed acquired from the rotation speed detector 42 is greater than the second threshold value (step S101). When the motor rotation speed is greater than the second threshold value (step S101: YES), the advance angle/energization angle controller 46 advances the process to step S102. Further, when the motor rotation speed is equal to or less than the second threshold value (step S101: NO), the advance angle/energization angle controller 46 advances the process to step S108.

In step S102, the motor device 100 performs high-speed energization control. In this case, the advance angle/energization angle controller 46 performs, for example, control that has advance angle control and that fixes the energization angle at a predetermined energization angle of 121 degrees or more.

Next, the advance angle/energization angle controller 46 determines whether the motor rotation speed is greater than the second threshold value (step S103). When the motor rotation speed is greater than the second threshold value (step S103: YES), the advance angle/energization angle controller 46 advances the process to step S104. Further, when the motor rotation speed is equal to or less than the second threshold value (step S103: NO), the advance angle/energization angle controller 46 advances the process to step S108.

In step S104, the advance angle/energization angle controller 46 determines whether the output duty is equal to or greater than the duty limit value. The advance angle/energization angle controller 46 acquires the output duty (output command value) generated by the duty controller 44 and the duty limit value set by the upper limit value setting part 45, and determines whether the output duty is equal to or greater than the duty limit value. When the output duty is equal to or greater than the duty limit value (step S104: YES), the advance angle/energization angle controller 46 advances the process to step S105. Further, when the output duty is less than the duty limit value (step S104: NO), the advance angle/energization angle controller 46 returns the process to step S102.

In step S105, the advance angle/energization angle controller 46 determines whether the motor rotation speed is equal to or less than the first threshold value. When the motor rotation speed is equal to or less than the first threshold value (step S105: YES), the advance angle/energization angle controller 46 advances the process to step S106. Further, when the motor rotation speed is greater than the first threshold value (step S105: NO), the advance angle/energization angle controller 46 advances the process to step S107.

In step S106 (control changing step), the motor device 100 performs wide-angle prohibition control. In this case, the advance angle/energization angle controller 46 performs, for example, control that has advance angle control (for example, an advance angle of 0 degree) and that fixes the energization angle at a predetermined energization angle of 120 degrees or less (for example, 120 degrees). After the process of step S106, the advance angle/energization angle controller 46 returns the process to step S103.

Further, in step S107, the motor device 100 performs boost control. In this case, the advance angle/energization angle controller 46 performs, for example, control that has advance angle control and control of advance angle and energization angle that is variable according to the target rotation speed with the energization angle at 121 degrees or more. After the process of step S107, the advance angle/energization angle controller 46 returns the process to step S103.

Further, in step S108, the motor device 100 performs low-speed energization control. In this case, the advance angle/energization angle controller 46 performs, for example, control that does not have advance angle control and that fixes the energization angle at 120 degrees. After the process of step S108, the advance angle/energization angle controller 46 returns the process to step S101.

Next, the effect on an overcurrent in the energization control process of the motor device 100 according to this embodiment will be described with reference to FIG. 3 and FIG. 4.

Figure 3:
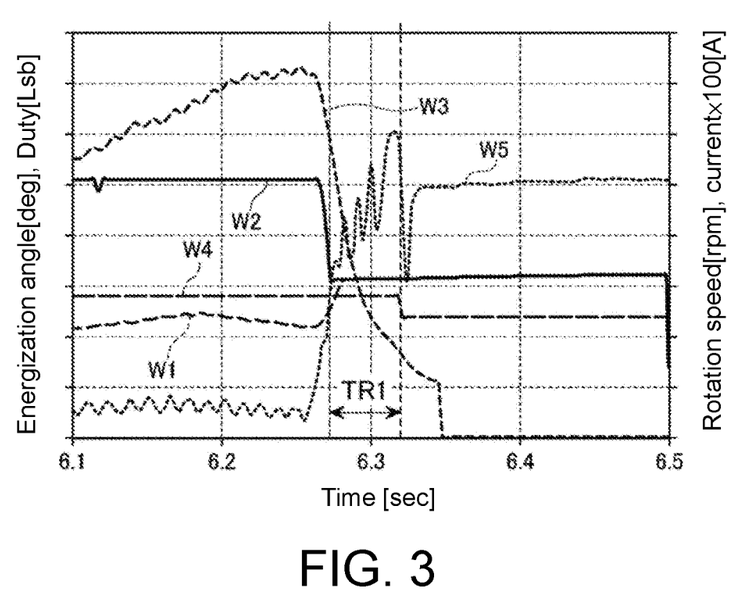
FIG. 3 is a diagram showing the operation of the energization control process in the conventional art.

FIG. 3 is a diagram showing the operation of the energization control process in the conventional art for comparison. FIG. 4 is a diagram showing an example of the operation of the energization control process of the motor device 100 according to this embodiment.

The graph shown in FIG. 3 shows the energization control process in the conventional art. The horizontal axis of the graph represents time, and the vertical axis represents the energization angle, output duty, rotation speed, and current. Further, the waveform W1 indicates the output duty, the waveform W2 indicates the duty limit value, and the waveform W3 indicates the motor rotation speed. In addition, the waveform W4 indicates the energization angle, and the waveform W5 indicates the current flowing through the motor 2.

Figure 4:
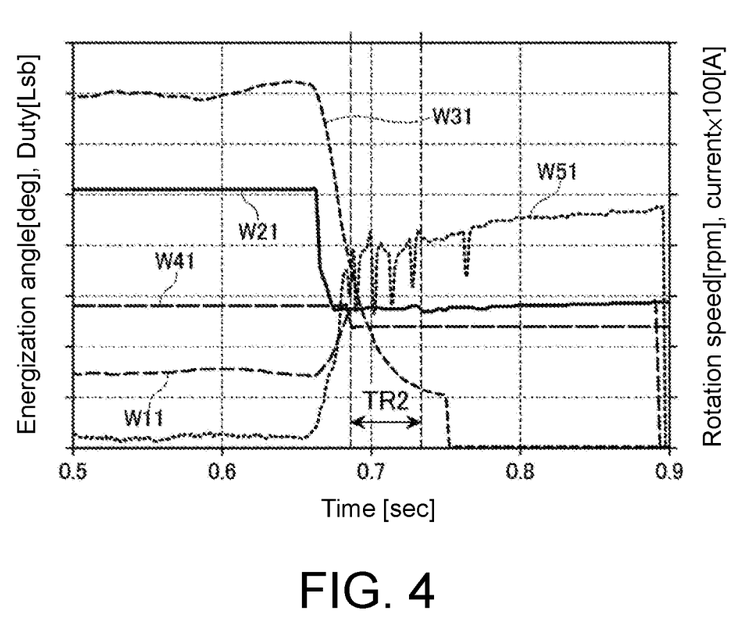
FIG. 4 is a diagram showing an example of the operation of the energization control process of the motor device according to the first embodiment.

Besides, the graph shown in FIG. 4 shows the energization control process of this embodiment. The horizontal axis of the graph represents time, and the vertical axis represents the energization angle, output duty, rotation speed, and current. Further, the waveform W11 indicates the output duty, the waveform W21 indicates the duty limit value, and the waveform W31 indicates the motor rotation speed. In addition, the waveform W41 indicates the energization angle, and the waveform W51 indicates the current flowing through the motor 2.

In the conventional energization control process shown in FIG. 3, in the period TR1, according to the decrease in the motor rotation speed (see waveform W3), the output duty rises and reaches the duty limit value (see waveforms W1 and W2), and the current flowing through the motor 2 increases (waveform W5). Here, in the conventional energization control process, since wide-angle energization with an energization angle greater than 120 degrees is maintained during the period TR1, the current flowing through the motor 2 indicated by the waveform W5 rises in the period TR1, indicating that an overcurrent occurs.

In contrast thereto, in the energization control process of this embodiment shown in FIG. 4, in the period TR2, according to the decrease in the motor rotation speed (see waveform W3), the output duty rises and reaches the duty limit value (see waveform W11 and waveform W21), and high-speed energization control with an energization angle greater than 120 degrees is changed to wide-angle prohibition control with an energization angle of 120 degrees. Thus, in the energization control process of this embodiment, in the period TR2, the current flowing through the motor 2 indicated by the waveform W51 does not rise as in the conventional art (waveform W5) shown in FIG. 3, and an overcurrent does not occur.

Furthermore, the principle that the value of the current flowing through the motor 2 can be limited by changing the energization angle from a wide-angle energization angle greater than 120 degrees to an energization angle of 120 degrees or less will be described with reference to (a) and (b) of FIG. 5 and (a) and (b) of FIG. 6.

Figure 5:
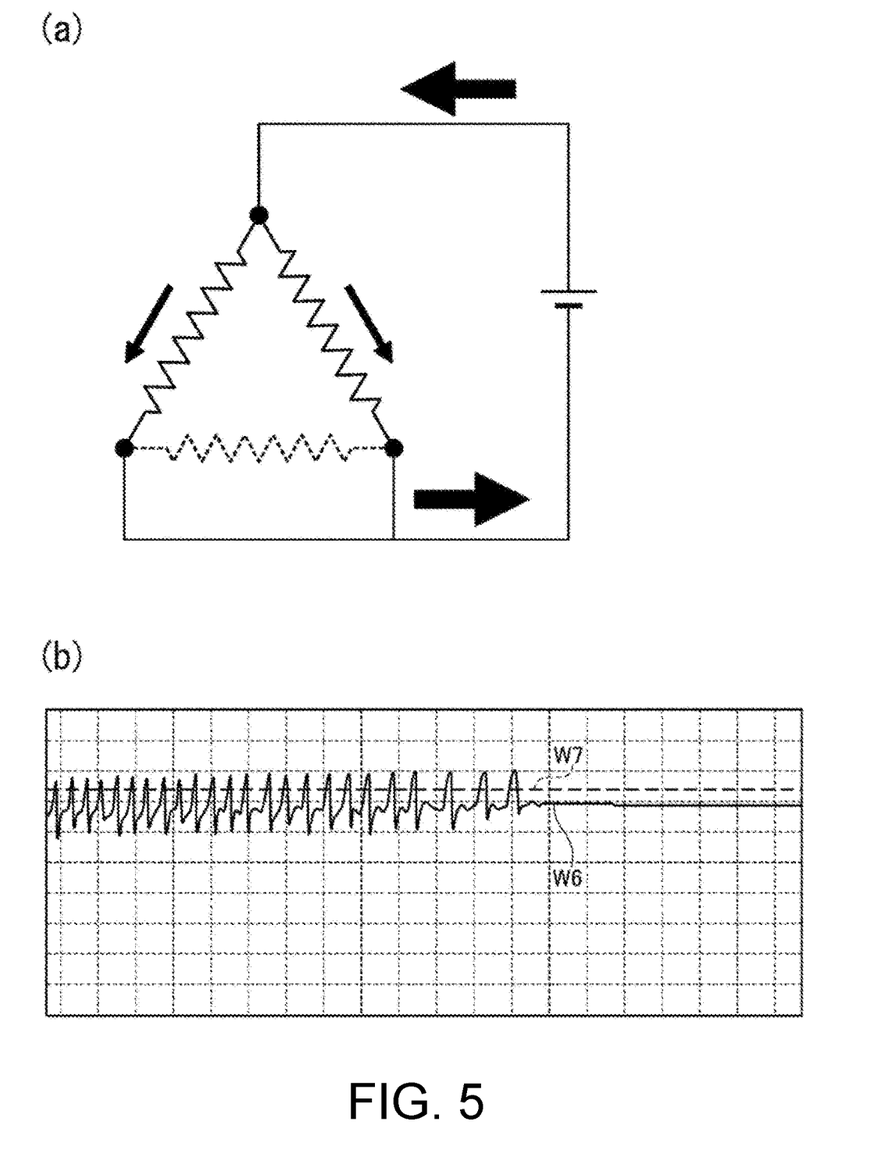

(a) and (b) of FIG. 5 are diagrams illustrating the current flowing through the motor 2 when the energization angle of the motor device 100 according to this embodiment exceeds 120 degrees.

As shown in (a) of FIG. 5, when the energization angle exceeds 120 degrees, it becomes two-phase energization, and when the resistance of each winding (armature coil 21u, armature coil 21v, and armature coil 21w) is set to "R", the resistance between terminals is (R/2).

In addition, (b) of FIG. 5 shows the current flowing through the motor 2 in this case (for example, when the energization angle is 140 degrees). In (b) of FIG. 5, the horizontal axis of the graph represents time, and the vertical axis represents the current.

Further, the waveform W6 indicates the waveform of the current flowing through the motor 2 in this case (for example, when the energization angle is 140 degrees), and the waveform W7 indicates the current limit value, which is the criterion for determining overcurrent.

As shown in (b) of FIG. 5, when the energization angle is 140 degrees, the motor 2 is energized in two phases, and an overcurrent exceeding the waveform W7 is generated (see waveform W6).

Figure 6:
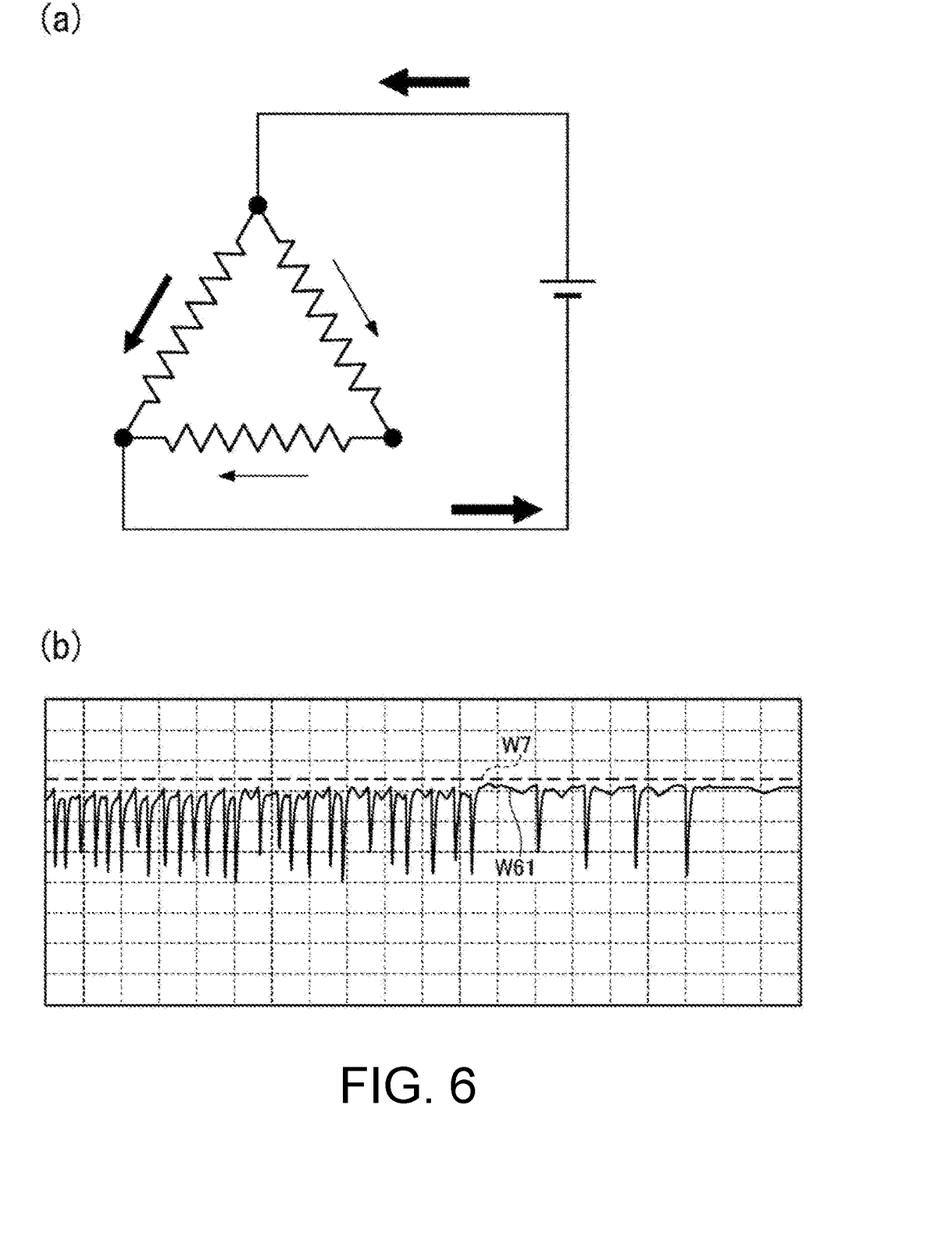

In contrast thereto, (a) and (b) of FIG. 6 are diagrams illustrating the current flowing through the motor 2 when the energization angle of the motor device 100 according to this embodiment is 120 degrees.

In this case, as shown in (a) of FIG. 6, since the energization angle is 120 degrees, it becomes three-phase energization, and when the resistance of each winding (armature coil 21u, armature coil 21v, and armature coil 21w) is set to "R", the resistance between terminals is (2R/3). That is, when the energization angle is 120 degrees, the resistance between terminals is (4/3)=about 1.33 times the resistance between terminals when the energization angle exceeds 120 degrees. Thus, the current flowing through the motor 2 due to three-phase energization is reduced by about 25% compared to the current flowing through the motor 2 due to two-phase energization.

Further, (b) of FIG. 6 shows the current flowing through the motor 2 in this case (for example, when the energization angle is 120 degrees). In (b) of FIG. 6, the horizontal axis of the graph represents time, and the vertical axis represents the current.

In addition, the waveform W61 indicates the waveform of the current flowing through the motor 2 in this case (for example, when the energization angle is 120 degrees), and the waveform W7 indicates the current limit value, which is the criterion for determining overcurrent.

As shown in (b) of FIG. 6, when the energization angle is 120 degrees, the motor 2 is energized in three phases and is suppressed to a current lower than the waveform W7 (see waveform W61).

As described above, the motor device 100 according to this embodiment includes the motor 2, the rotation speed detector 42, the drive signal generator 43, and the inverter 50. The motor 2 has windings of three phases (armature coil 21u, armature coil 21v, and armature coil 21w) and is rotationally driven. The rotation speed detector 42 detects the rotation speed of the motor 2. The drive signal generator 43 controls the output duty (duty ratio), which is the output command value indicating the drive output of the motor 2, so as not to exceed the duty limit value (duty ratio upper limit value), and performs control for the energization angle of each phase of the three phases and advance angle control for shifting the phase from the reference position to generate a drive signal corresponding to the output duty. The inverter 50 supplies an alternating current to the three-phase armature coils (21u, 21v, 21w) based on the drive signal. The drive signal generator 43 includes the advance angle/energization angle controller 46 that performs advance angle control and changes the energization angle to 120 degrees or less while performing advance angle control when the output duty is equal to or greater than the duty limit value and the rotation speed of the motor 2 is equal to or less than a predetermined threshold value (equal to or less than the first threshold value) in a state where the energization angle is greater than 120 degrees.

Thus, the motor device 100 according to this embodiment is capable of changing the energization angle to 120 degrees or less to reduce the current flowing through the motor 2 by about 25%, as shown in (a) and (b) of FIG. 5 and (a) and (b) of FIG. 6 described above, and is capable of reducing the occurrence of an overcurrent, which may occur even with the limit of the duty limit value, as shown in FIG. 3 and FIG. 4. In addition, since the motor device 100 according to this embodiment is capable of reducing the occurrence of an overcurrent, it is possible to reduce demagnetization of the permanent magnet 22b.

Furthermore, in this embodiment, the advance angle/energization angle controller 46 changes the energization angle to 120 degrees without performing advance angle control when the rotation speed of the motor 2 is equal to or less than the second threshold value that is less than the first threshold value which is the predetermined threshold value.

Thus, the motor device 100 according to this embodiment is capable of performing control appropriately by low-speed energization control in low-speed rotation where the rotation speed of the motor 2 is equal to or less than the second threshold value.

Further, in this embodiment, the advance angle/energization angle controller 46 changes the energization angle to be greater than 120 degrees while performing advance angle control and changes to perform variable control for advance angle and energization angle according to the target rotation speed of the motor 2 when the output duty is equal to or greater than the duty limit value and the rotation speed of the motor 2 is greater than the first threshold value.

Thus, the motor device 100 according to this embodiment is capable of performing control more appropriately by boost control when more output is required at a high rotation speed. Also, as boost control is performed only when high output is required, it is possible to suppress deterioration in quietness during normal operation.

Further, in this embodiment, the advance angle/energization angle controller 46 sets the advance angle in the case where the duty ratio is equal to or greater than the duty limit value and the rotation speed of the motor 2 is equal to or less than the first threshold value to be less than the advance angle in the case where the duty ratio is equal to or greater than the duty limit value and the rotation speed of the motor 2 is greater than the first threshold value.

Thus, the motor device 100 according to this embodiment is capable of further reducing the occurrence of an overcurrent and suppressing deterioration in the motor position detection accuracy.

Further, in this embodiment, the duty limit value is changed according to the rotation speed of the motor 2.

Thus, in the motor device 100 according to this embodiment, the duty limit value is appropriately set according to the rotation speed of the motor 2, making it possible to further educe the occurrence of an overcurrent.

Further, the motor control method according to this embodiment is a motor control method for the motor device 100 which includes: the motor 2 that has armature coils of three phases (21u, 21v, 21w) and is rotationally driven, and the inverter 50 that supplies an alternating current to the three-phase armature coils (21u, 21v, 21w) based on a drive signal. The motor control method includes a rotation speed detecting step and a drive signal generating step. In the rotation speed detecting step, the rotation speed detector 42 detects the rotation speed of the motor. In the drive signal generating step, the drive signal generator 43 controls the output duty indicating the drive output of the motor 2 so as not to exceed the duty limit value, and performs control for the energization angle of each phase of the three phases and advance angle control for shifting the phase from the reference position to generate a drive signal corresponding to the output duty. Moreover, in the drive signal generating step, the motor control method further includes an advance angle/energization angle controlling step in which the advance angle/energization angle controller 46 of the drive signal generator 43 changes the energization angle to 120 degrees or less while performing advance angle control when the output duty is equal to or greater than the duty limit value and the rotation speed of the motor 2 is equal to or less than a predetermined threshold value (equal to or less than the first threshold value) in a state where the energization angle is greater than 120 degrees.

Thus, the motor control method according to this embodiment achieves the same effect as the motor device 100 described above, and is capable of reducing the occurrence of an overcurrent that may occur even with the limit of the duty limit value.

Second Embodiment

Next, a wiper device 200 according to the second embodiment will be described with reference to the drawings.

Figure 7:
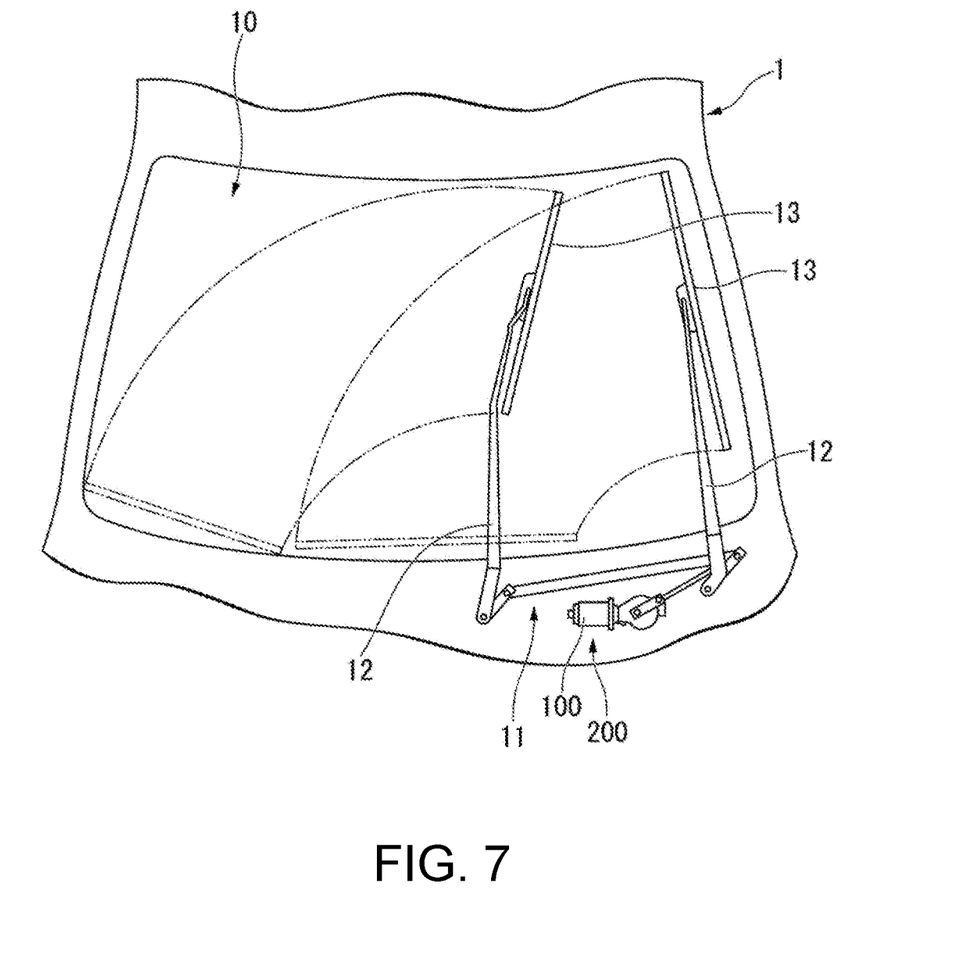
FIG. 7 is a configuration diagram showing an example of the wiper device according to the second embodiment.

FIG. 7 is a configuration diagram showing an example of the wiper device 200 according to the second embodiment.

As shown in FIG. 7, the wiper device 200 performs a wiping operation on the window surface of a window glass 10 of a vehicle 1. The wiper device 200 includes the motor device 100, a link mechanism 11, two wiper arms 12, and a wiper blade 13 attached to the tip of each wiper arm 12.

The motor device shown in FIG. 7 is the motor device 100 of the first embodiment described above, and detailed description thereof will be omitted here.

The wiper arm 12 is rotationally driven by the motor device 100 to move on the window surface of the window glass 10, and perform a wiping operation with the wiper blade 13 attached to the tip of the wiper arm 12.

The two wiper arms 12 are connected by the link mechanism 11.

The wiper blade 13 is provided to be pressed against the window glass 10 by the wiper arm 12.

The wiper blade 13 includes a blade rubber (not shown) held by a blade holder attached to the tip of the wiper arm 12. When the wiper arm 12 is swung by the motor device 100, the wiper blade 13 reciprocates within the wiping range on the outer surface of the window glass 10, and wipes the window glass 10 with the blade rubber (not shown).

As described above, the wiper device 200 according to this embodiment uses the motor device 100 to cause the wiper member (wiper arm 12 and wiper blade 13) to perform the wiping operation on the window surface.

Thus, the wiper device 200 according to this embodiment achieves the same effect as the motor device 100 described above, and is capable of reducing the occurrence of an overcurrent that may occur even with the limit of the duty limit value.

It should be noted that the invention is not limited to the above embodiments, and can be modified without departing from the scope of the invention.

For example, although the above embodiment illustrates an example in which the three-phase armature coils (21u, 21v, 21w) of the motor 2 are connected by delta connection, the invention is not limited thereto, and other connections such as star connection may be used.

In addition, although the above embodiment illustrates control using two threshold values, the first threshold value and the second threshold value, of the motor rotation speed, the invention is not limited thereto, and the motor device 100 may perform control that does not include control of the second threshold value.

Further, although the above embodiment illustrates an example in which the first threshold value and the second threshold value of the motor rotation speed are set to predetermined values in advance, the invention is not limited thereto. For example, the first threshold value and the second threshold value may be set according to the current flowing through the motor 2.

Thus, the motor device 100 is capable of appropriately setting the first threshold value, and is capable of appropriately reducing the occurrence of an overcurrent while expanding the range of the wide-angle energization control (for example, high-speed energization control) described above to the limit. That is, the motor device 100 is capable of appropriately reducing the occurrence of an overcurrent without reducing the performance of the motor 2 as much as possible.

Further, although the above embodiment illustrates an example in which the first threshold value and the second threshold value are the motor rotation speed, the invention is not limited thereto. For example, the motor device 100 may be provided with a current value detector, and the first threshold value and the second threshold value may be the values of currents flowing through the motor 2.

Further, although the above embodiment illustrates an example in which the motor device 100 is used in the wiper device 200, the invention is not limited thereto, and the motor device 100 may also be used for other purposes.

Each configuration included in the motor device 100 described above has a computer system therein. Then, a program for realizing the function of each configuration included in the motor device 100 described above may be recorded in a computer-readable recording medium, and the program recorded in this recording medium may be loaded into the computer system and executed so as to perform the processing in each configuration included in the motor device 100 described above. Here, "loading and executing the program recorded in the recording medium into the computer system" includes installing the program in the computer system. The "computer system" here includes hardware such as an OS and peripheral devices.

In addition, the "computer system" may include a plurality of computer devices connected via a network that includes communication lines such as the Internet, WAN, LAN, and dedicated lines. Moreover, the "computer-readable recording medium" refers to a portable medium such as a flexible disk, a magneto-optical disk, a ROM, and a CD-ROM, and a storage device such as a hard disk built in the computer system. Thus, the recording medium storing the program may be a non-transitory recording medium such as a CD-ROM.

Furthermore, some or all of the functions described above may be implemented as an integrated circuit such as an LSI (Large Scale Integration). Each of the functions mentioned above may be made into a processor individually, or some or all of the functions may be integrated and made into a processor. Also, the method of circuit integration is not limited to LSI, and may be implemented by a dedicated circuit or a general-purpose processor. In addition, when a circuit integration technology that replaces LSI becomes available because of progress in semiconductor technology, an integrated circuit based on the technology may be used.

What is claimed is:

1. A motor device, comprising:
   a motor that has windings of three phases and is rotationally driven;
   a rotation speed detector that detects a rotation speed of the motor;
   a drive signal generator that controls a duty ratio indicating a drive output of the motor so as not to exceed a duty ratio upper limit value, and performs control for an energization angle of each phase of the three phases and performs advance angle control for shifting the phase from a reference position to generate a drive signal corresponding to the duty ratio; and
   an inverter that supplies an alternating current to the windings of three phases based on the drive signal, wherein
   the drive signal generator comprises an advance angle/energization angle controller that changes the energization angle to 120 degrees or less while performing the advance angle control in response to the duty ratio being equal to or greater than the duty ratio upper limit value and the rotation speed of the motor being equal to or less than a predetermined threshold value in a state where the energization angle is greater than 120 degrees.

2. The motor device according to claim 1, wherein
   the advance angle/energization angle controller changes the energization angle to 120 degrees without performing the advance angle control in response to the rotation speed of the motor being equal to or less than a second threshold value that is less than a first threshold value which is the predetermined threshold value.

3. The motor device according to claim 1, wherein
   the advance angle/energization angle controller changes the energization angle to be greater than 120 degrees while performing the advance angle control and changes to perform variable control for advance angle and the energization angle according to a target rotation speed of the motor in response to the duty ratio being equal to or greater than the duty ratio upper limit value and the rotation speed of the motor being greater than the predetermined threshold value.

4. The motor device according to claim 1, wherein
   the advance angle/energization angle controller sets an advance angle in a case where the duty ratio is equal to or greater than the duty ratio upper limit value and the rotation speed of the motor is equal to or less than the predetermined threshold value to be less than an advance angle in a case where the duty ratio is equal to or greater than the duty ratio upper limit value and the rotation speed of the motor is greater than the predetermined threshold value.

5. The motor device according to claim 1, wherein
   the duty ratio upper limit value is changed according to the rotation speed of the motor.

6. A wiper device, comprising:
   the motor device according to claim 1, wherein
   the motor device is used to cause a wiper member to perform a wiping operation on a window surface.

7. A motor control method for a motor device comprising a motor that has windings of three phases and is rotationally driven, and an inverter that supplies an alternating current to the windings of three phases based on a drive signal, the motor control method comprising:
   rotation speed detecting in which a rotation speed detector detects a rotation speed of the motor; and drive signal generating in which a drive signal generator controls a duty ratio indicating a drive output of the motor so as not to exceed a duty ratio upper limit value, and performs control for an energization angle of each phase of the three phases and performs advance angle control for shifting the phase from a reference position to generate the drive signal corresponding to the duty ratio, wherein in the drive signal generating, the motor control method further comprises:

advance angle/energization angle controlling in which an advance angle/energization angle controller of the drive signal generator changes the energization angle to 120 degrees or less while performing the advance angle control in response to the duty ratio being equal to or greater than the duty ratio upper limit value and the rotation speed of the motor being equal to or less than a predetermined threshold value in a state where the energization angle is greater than 120 degrees.

8. The motor device according to claim 2, wherein the advance angle/energization angle controller changes the energization angle to be greater than 120 degrees while performing the advance angle control and changes to perform variable control for advance angle and the energization angle according to a target rotation speed of the motor in response to the duty ratio being equal to or greater than the duty ratio upper limit value and the rotation speed of the motor being greater than the predetermined threshold value.

9. The motor device according to claim 2, wherein the advance angle/energization angle controller sets an advance angle in a case where the duty ratio is equal to or greater than the duty ratio upper limit value and the rotation speed of the motor is equal to or less than the predetermined threshold value to be less than an advance angle in a case where the duty ratio is equal to or greater than the duty ratio upper limit value and the rotation speed of the motor is greater than the predetermined threshold value.

10. The motor device according to claim 3, wherein the advance angle/energization angle controller sets an advance angle in a case where the duty ratio is equal to or greater than the duty ratio upper limit value and the rotation speed of the motor is equal to or less than the predetermined threshold value to be less than an advance angle in a case where the duty ratio is equal to or greater than the duty ratio upper limit value and the rotation speed of the motor is greater than the predetermined threshold value.

11. The motor device according to claim 2, wherein the duty ratio upper limit value is changed according to the rotation speed of the motor.

12. The motor device according to claim 3, wherein the duty ratio upper limit value is changed according to the rotation speed of the motor.

13. The motor device according to claim 4, wherein the duty ratio upper limit value is changed according to the rotation speed of the motor.

* * * * *